J. F. Fales,
Carpet Lining.
No. 4296. Reissued Mar. 14, 1871.
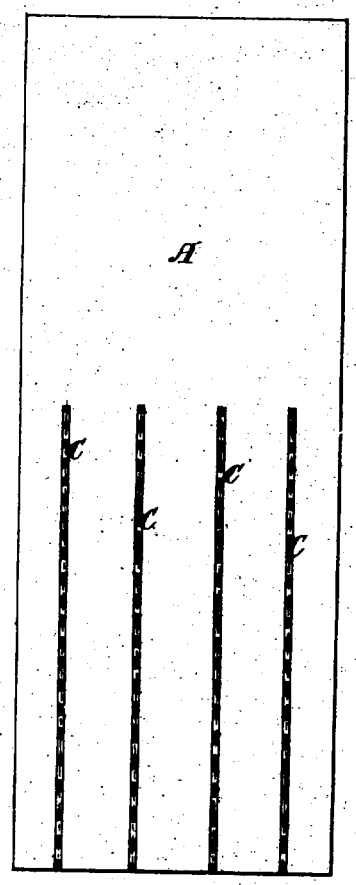
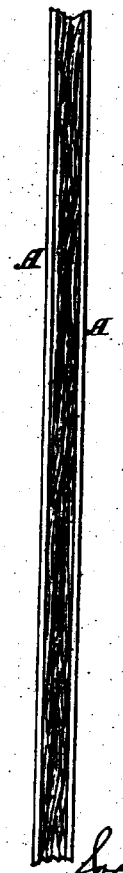
Witnesses:
A. M. Malcomson Jr.
J. H. Hunter
Joel F. Fales
Inventor:
per Cochrane & Todd
Attorneys.

UNITED STATES PATENT OFFICE.

JOEL F. FALES, OF WALPOLE, MASSACHUSETTS.

IMPROVEMENT IN CARPET-LININGS.

Specification forming part of Let s Patent No. 52,835, dated February 27, 1866; Reissue No. 4,296, dated March 14, 1871.

*To all whom it may concern:*

Be it known that I, JOEL F. FALES, of Walpole, Norfolk county, State of Massachusetts, have invented a new and Improved Carpet Lining; and I do hereby declare that the following is a full, clear, and exact description thereof, which will enable others skilled in the art to make and use the same.

Carpet-lining as heretofore made has been composed of a filling, such as a layer of cotton or some equivalent material, contained between two surfaces of the paper employed to inclose said filling, the parts being retained together either by reason of the adhering of the surfaces of the filling with the adjoining surfaces of the paper or by the aid of glue, paste, or other equivalent adhesive material applied in any convenient way between such surfaces of the filling and the paper. That which was made without the means referred to for causing the adhering of the adjacent surfaces of filling and paper was liable to and did become displaced in use as well as in the laying of it down for use. In that which was made with the addition of such means the parts were better retained in their proper relations to each other, both in handling and in use; but it has been found that vermin are attracted to and apt to be harbored in lining so constructed, not only to its detriment, but to that of the carpet sought to be protected by such lining as well.

By my improved manufacture there is substituted for this glue, paste, or equivalent adhesive material a new means—namely, stitches or sewing—I thereby obtaining a sewed or quilted carpet-lining as a new article of manufacture.

The annexed drawing serves to illustrate one form in which said last-mentioned means may be employed in connection with the filling and the paper inclosing such filling.

In Figure 1 of such drawing the stitches or sewing retaining the filling and adjoining surfaces of the paper A are represented as being applied in rows C, running lengthwise of the carpet-lining, and they pass through from surface to surface of the paper, thereby connecting the adjoining surfaces and the filling B together.

I claim as new—

A carpet-lining, substantially as described, the filling of which and the paper adjoining such filling are retained together by means of stitches or sewing.

JOEL F. FALES.

Witnesses:

FRANCIS GOULD,
S. B. KIDDER.